United States Patent
Yasuda et al.

(10) Patent No.: US 10,957,052 B2
(45) Date of Patent: *Mar. 23, 2021

(54) MONITORING APPARATUS, MONITORING SYSTEM, MONITORING METHOD, AND COMPUTER-READABLE STORAGE MEDIUM

(71) Applicant: NEC CORPORATION, Tokyo (JP)

(72) Inventors: Tatsushi Yasuda, Tokyo (JP); Satoru Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,196

(22) Filed: Mar. 11, 2019

(65) Prior Publication Data

US 2019/0206064 A1  Jul. 4, 2019

Related U.S. Application Data

(63) Continuation of application No. 15/560,196, filed as application No. PCT/JP2016/050742 on Jan. 12, 2016, now Pat. No. 10,497,131.

(30) Foreign Application Priority Data

Mar. 23, 2015 (JP) .............................. JP2015-059782

(51) Int. Cl.
*G06K 9/00* (2006.01)
*G06T 7/246* (2017.01)
(Continued)

(52) U.S. Cl.
CPC .......... *G06T 7/246* (2017.01); *G06K 9/00771* (2013.01); *G06T 1/0007* (2013.01);
(Continued)

(58) Field of Classification Search
CPC ............................................ G06T 2207/30232
See application file for complete search history.

(56) References Cited

U.S. PATENT DOCUMENTS

2003/0235327 A1  12/2003  Srinivasa
2009/0278934 A1  11/2009  Ecker et al.
(Continued)

FOREIGN PATENT DOCUMENTS

JP  8-123935 A   5/1996
JP  8-337031 A  12/1996
(Continued)

OTHER PUBLICATIONS

Notice of Allowance dated Jul. 31, 2019 issued by the United States Patent and Trademark Office in U.S. Appl. No. 15/560,196.
(Continued)

*Primary Examiner* — Oneal R Mistry
(74) *Attorney, Agent, or Firm* — Sughrue Mion, PLLC

(57) ABSTRACT

A monitoring apparatus 10 includes: a monitoring line setting unit 11 that sets a monitoring line in an image acquired from the image capturing unit; and an overlapping detection unit 12 that detects overlapping between an object in the image and the monitoring line. If overlapping is detected by the overlapping detection unit 12, the monitoring line setting unit 11 sets a new monitoring line according to the object.

15 Claims, 8 Drawing Sheets

(51) Int. Cl.
*H04N 7/18* (2006.01)
*G08B 13/196* (2006.01)
*G08B 25/08* (2006.01)
*G06T 7/12* (2017.01)
*G06T 7/10* (2017.01)
*G06T 1/00* (2006.01)

(52) U.S. Cl.
CPC ............... *G06T 7/10* (2017.01); *G06T 7/12* (2017.01); *G08B 13/19606* (2013.01); *G08B 13/19613* (2013.01); *G08B 25/08* (2013.01); *H04N 7/183* (2013.01); *G06T 2207/30232* (2013.01)

(56) References Cited

U.S. PATENT DOCUMENTS

| | | | |
|---|---|---|---|
| 2011/0013018 A1* | 1/2011 | Leblond | G08G 1/0175 348/143 |
| 2014/0003657 A1 | 1/2014 | Funagi | |
| 2014/0064554 A1 | 3/2014 | Coulter et al. | |
| 2014/0347475 A1* | 11/2014 | Divakaran | G06K 9/00771 348/135 |
| 2015/0244989 A1 | 8/2015 | Liao | |
| 2015/0264296 A1* | 9/2015 | Devaux | H04N 9/8205 386/226 |
| 2016/0105609 A1 | 4/2016 | Pettegrew et al. | |
| 2017/0076465 A1* | 3/2017 | Adachi | G06T 7/20 |

FOREIGN PATENT DOCUMENTS

| | | |
|---|---|---|
| JP | 9-330415 A | 12/1997 |
| JP | 11-161875 A | 6/1999 |
| JP | 2001-189925 A | 7/2001 |
| JP | 2006-252248 A | 9/2006 |
| JP | 2007-018324 A | 1/2007 |
| JP | 2010-128727 A | 6/2010 |
| JP | 2011-90606 A | 5/2011 |
| JP | 2011-151743 A | 8/2011 |
| JP | 2012-208878 A | 10/2012 |
| JP | 2012-215983 A | 11/2012 |
| JP | 2013-254471 A | 12/2013 |
| JP | 2014-011584 A | 1/2014 |
| JP | 2014-56536 A | 3/2014 |
| JP | 2014-74957 A | 4/2014 |
| JP | 2014-179923 A | 9/2014 |
| JP | 2015-18340 A | 1/2015 |

OTHER PUBLICATIONS

Communication dated Apr. 10, 2019 by the United States Patent and Trademark Office in U.S. Appl. No. 15/560,196.
International Search Report for PCT/JP2016/050742 dated Apr. 5, 2016 [PCT/ISA/210].
Written Opinion for PCT/JP2016/050742 dated Apr. 5, 2016 [PCT/ISA/237].
Notice of Reasons for Refusal dated Jun. 30, 2020, from the Japanese Patent Office in Application No. 2019-134292.

* cited by examiner

MONITORING APPARATUS, MONITORING SYSTEM, MONITORING METHOD, AND COMPUTER-READABLE STORAGE MEDIUM

CROSS REFERENCE TO RELATED APPLICATIONS

This application is a continuation of U.S. application Ser. No. 15/560,196 filed Sep. 21, 2017, which is a National Stage of International Application No. PCT/JP2016/050742 filed Jan. 12, 2016, claiming priority based on Japanese Patent Application No. 2015-059782 filed Mar. 23, 2015, the contents of all of which are incorporated herein by reference in their entirety.

TECHNICAL FIELD

The present invention relates to a monitoring apparatus, a monitoring system, and a monitoring method for performing monitoring using a monitoring camera, and a computer-readable storage medium storing a program for realizing these.

BACKGROUND ART

In recent years, due to improvements in camera technology, use of monitoring systems in which monitoring cameras are used has increased. With these monitoring systems, an intrusion detection area is set in an image acquired from the monitoring camera, and a warning is output to a manager if an intruder intruding in the intrusion detection area is detected (e.g., see Patent Document 1).

Also, although the monitoring system normally detects an intruder by extracting changes in an image, the larger the region to be extracted is, the greater the system load is, and the more time-consuming detection processing is. For this reason, a technique has been proposed in which a monitoring line called a "trip wire" is set in the image and a person who crosses the monitoring line is detected as an intruder (e.g., see Patent Documents 2 and 3).

Specifically, the monitoring system disclosed in Patent Document 2 detects an intruder by specifying a change region in which a feature amount changes in the image acquired from the monitoring camera and detecting interference between the specified change region and the monitoring line. Also, the monitoring system disclosed in Patent Document 3 detects an intruder by extracting pixels existing at the position of the monitoring line from an image acquired from the monitoring camera, arranging the pixels in a line to create a pixel data line, and then analyzing change in a time series in the pixel values of the pixel data line.

CITATION LIST

Patent Document

Patent Document 1: JP 2012-215983A
Patent Document 2: JP 2006-252248A
Patent Document 2: JP 2011-151743A

DISCLOSURE OF THE INVENTION

Problems to be Solved by the Invention

Incidentally, with the monitoring systems disclosed in Patent Documents 2 and 3, the monitoring line is set to be a street, pathway, or the like in the periphery of a facility being monitored. Also, since the image from the monitoring camera is a two-dimensional image, there are cases where the monitoring line and a vehicle overlap on the image due to the vehicle being parked or the like between the location being monitored and the monitoring camera. In this case, an intruder can intrude in the location being monitored without crossing the monitoring line, and therefore it is very difficult to detect an intruder with the monitoring systems disclosed in Patent Documents 2 and 3.

One example of an object of the present invention is to provide a monitoring apparatus, a monitoring system, a monitoring method, and a computer-readable storage medium according to which the above-described problems are eliminated and an intruder can be detected even if a pre-set monitoring line overlaps with an object on an image from a monitoring camera.

Means for Solving the Problems

In order to achieve the above-described object, a first monitoring apparatus according to an aspect of the present invention includes:
  a monitoring line setting unit configured to set a monitoring line in an image acquired from an image capturing unit; and
  an overlapping detection unit configured to detect overlapping between an object in the image and the monitoring line, wherein if overlapping is detected by the overlapping detection unit, the monitoring line setting unit sets a new monitoring line according to the object.

In order to achieve the above-described object, a second monitoring apparatus according to an aspect of the present invention includes:
  a monitoring line setting unit configured to set a monitoring line in an image acquired from an image capturing unit; and
  an overlapping detection unit configured to detect overlapping between an object in the image and the monitoring line,
  wherein if overlapping is detected by the overlapping detection unit, the monitoring line setting unit moves the monitoring line such that it does not overlap with the object.

In order to achieve the above-described object, a third monitoring apparatus according to an aspect of the present invention includes:
  a monitoring line setting unit configured to set a monitoring line in an image acquired from an image capturing unit; and
  an overlapping detection unit configured to detect overlapping between an object in the image and the monitoring line,
  wherein if overlapping is detected by the overlapping detection unit, the monitoring line setting unit sets a new monitoring line at a position that does not overlap with the object in a pre-designated region.

In order to achieve the above-described object, a first monitoring system according to an aspect of the present invention includes a monitoring camera and a monitoring apparatus,
  wherein the monitoring apparatus includes:
  a monitoring line setting unit configured to set a monitoring line in an image acquired from the monitoring camera; and an overlapping detection unit configured to detect overlapping between an object in the image and the monitoring line, and if overlapping is detected by the overlapping detection unit, the monitoring line setting unit sets a new monitoring line according to the object.

In order to achieve the above-described object, a second monitoring system according to an aspect of the present invention includes a monitoring camera and a monitoring apparatus, wherein the monitoring apparatus includes:
a monitoring line setting unit configured to set a monitoring line in an image acquired from the monitoring camera; and
an overlapping detection unit configured to detect overlapping between an object in the image and the monitoring line, and
if overlapping is detected by the overlapping detection unit, the monitoring line setting unit moves the monitoring line such that it does not overlap with the object.

In order to achieve the above-described object, a third monitoring system according to an aspect of the present invention includes a monitoring camera and a monitoring apparatus, wherein the monitoring apparatus includes:
a monitoring line setting unit configured to set a monitoring line in an image acquired from the monitoring camera; and
an overlapping detection unit configured to detect overlapping between an object in the
image and the monitoring line, and if overlapping is detected by the overlapping detection unit, the monitoring line setting unit sets a new monitoring line at a position that does not overlap with the object in a pre-designated region.

In order to achieve the above-described object, a first monitoring method according to an aspect of the present invention includes:
(a) a step of setting a monitoring line in an image acquired from an image capturing unit;
(b) a step of detecting overlapping between an object in the image and the monitoring line; and
(c) a step of setting a new monitoring line according to the object if overlapping is detected in the (b) step.

In order to achieve the above-described object, a second monitoring method according to an aspect of the present invention includes:
(a) a step of setting a monitoring line in an image acquired from an image capturing unit;
(b) a step of detecting overlapping between an object in the image and the monitoring line; and
(c) a step of moving the monitoring line such that it does not overlap with the object if overlapping is detected in the (b) step.

In order to achieve the above-described object, a third monitoring method according to an aspect of the present invention includes:
(a) a step of setting a monitoring line in an image acquired from an image capturing unit;
(b) a step of detecting overlapping between an object in the image and the monitoring line; and
(c) a step of setting a new monitoring line at a position such that it does not overlap with the object in a pre-designated region if overlapping is detected in the (b) step.

Furthermore, in order to achieve the above-described object, a first computer-readable storage medium according to an aspect of the present invention stores a program that includes commands for causing a computer to execute:
(a) a step of setting a monitoring line in an image acquired from an image capturing unit;
(b) a step of detecting overlapping between an object in the image and the monitoring line; and
(c) a step of setting a new monitoring line according to the object if overlapping is detected in the (b) step.

Furthermore, in order to achieve the above-described object, a second computer-readable storage medium according to an aspect of the present invention stores a program that includes commands for causing a computer to execute:
(a) a step of setting a monitoring line in an image acquired from an image capturing unit;
(b) a step of detecting overlapping between an object in the image and the monitoring line; and
(c) a step of moving the monitoring line such that it does not overlap with the object if overlapping is detected in the (b) step.

Furthermore, in order to achieve the above-described object, a third computer-readable storage medium according to an aspect of the present invention stores a program that includes commands for causing a computer to execute:
(a) a step of setting a monitoring line in an image acquired from an image capturing unit;
(b) a step of detecting overlapping between an object in the image and the monitoring line; and
(c) a step of setting a new monitoring line at a position such that it does not overlap with the object in a pre-designated region if overlapping is detected in the (b) step.

Effects of the Invention

As described above, according to the present invention, it is possible to detect an intruder even if a pre-set monitoring line overlaps with an object in an image from a monitoring camera.

DESCRIPTION OF EMBODIMENT

Embodiment

Hereinafter, a monitoring apparatus, a monitoring system, a monitoring method, and a program according to an embodiment of the present invention will be described with reference to FIGS. 1 to 8.

Configuration of Apparatus

Figure 1:
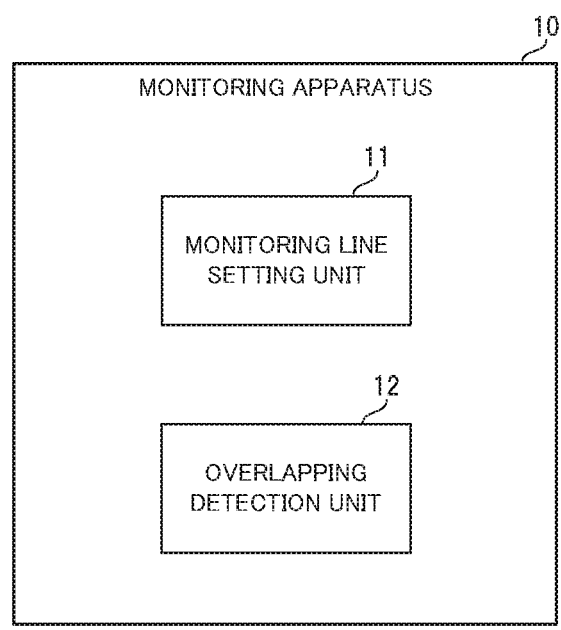
FIG. 1 is a block diagram schematically showing an example of a configuration of a monitoring apparatus according to an embodiment of the present invention.

First, a schematic configuration of a monitoring apparatus according to the present embodiment will be described with reference to FIG. 1. FIG. 1 is a block diagram schematically showing an example of a configuration of a monitoring apparatus according to an embodiment of the present invention. As shown in FIG. 1, a monitoring apparatus 10 according to the present embodiment includes a monitoring line setting unit 11 and an overlapping detection unit 12.

The monitoring line setting unit 11 sets a monitoring line in an image acquired from an image capturing unit (not shown in FIG. 1). The monitoring line is a line set in an image as a reference for determining detection of intrusion (see later-described FIG. 3).

Also, the overlapping detection unit 12 detects overlapping between an object in the image and the monitoring line. Also, if overlapping is detected by the overlapping detection unit 11, the monitoring line setting unit 12 sets a new monitoring line according to the object in the image.

Thus, in the present embodiment, a new monitoring line is set away from the object in the case where the monitoring line and the object overlap in the image due to an object such as a vehicle existing between a facility or the like being monitored and the image capturing unit. For this reason, according to the present invention, it is possible to detect an intruder even if a pre-set monitoring line overlaps with an object.

Figure 2:
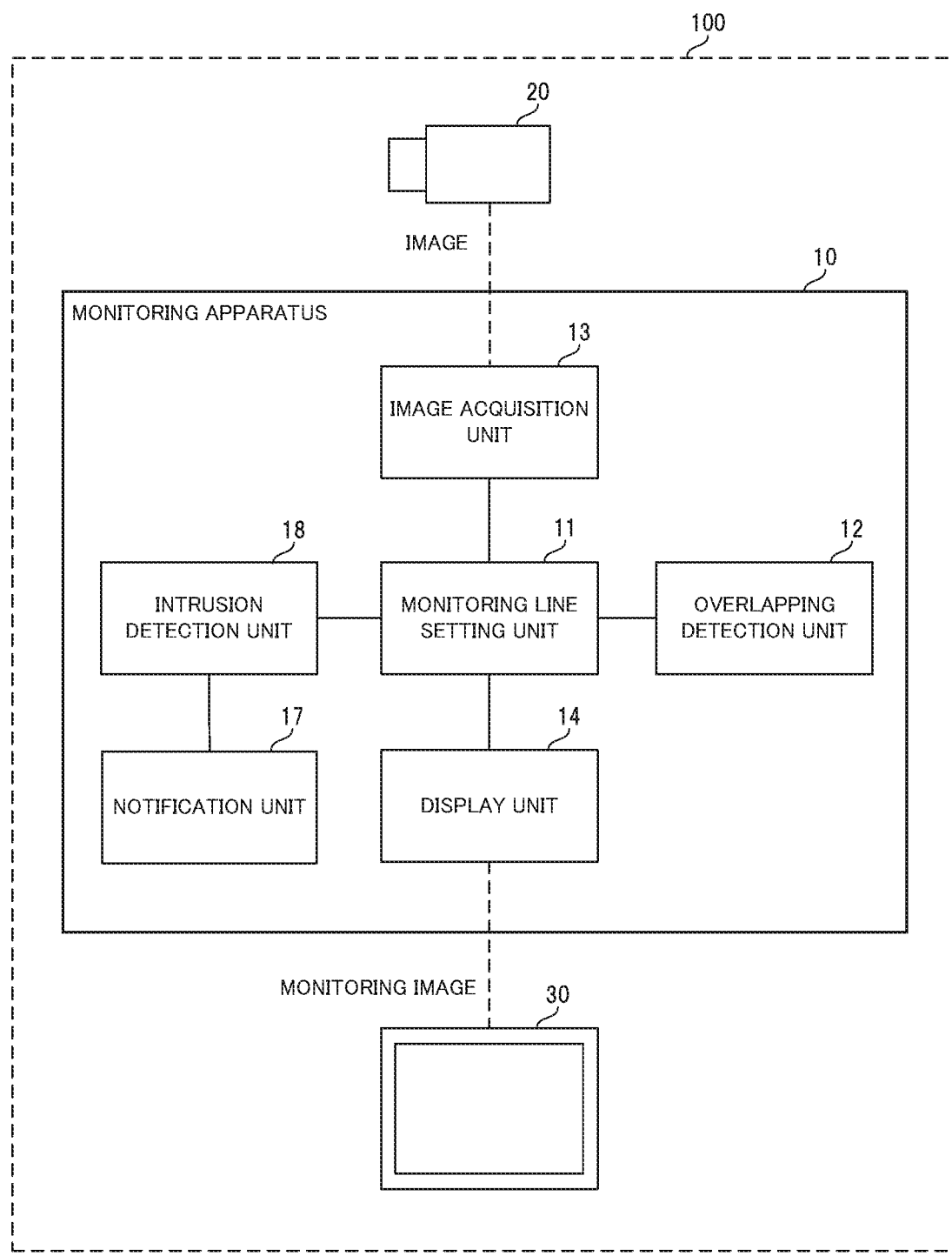
FIG. 2 is a block diagram specifically showing an example of a configuration of a monitoring system and a monitoring apparatus according to an embodiment of the present invention.
Figure 3A:
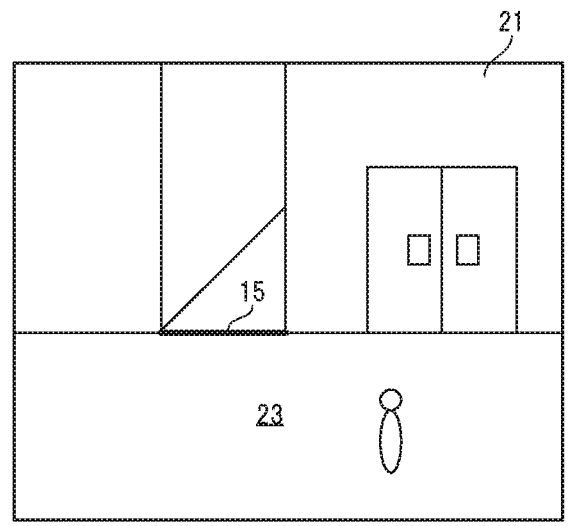
FIGS. 3A to 3C are diagrams each illustrating an example of a series of processes for when a monitoring apparatus according to an embodiment of the present invention sets a new monitoring line.
Figure 3B:
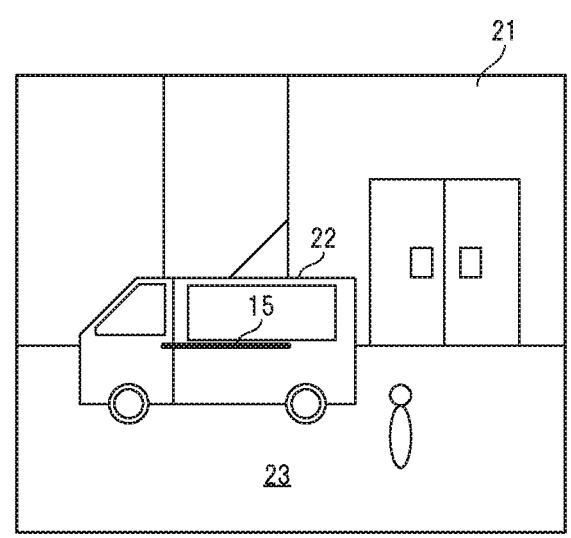
Figure 3C:
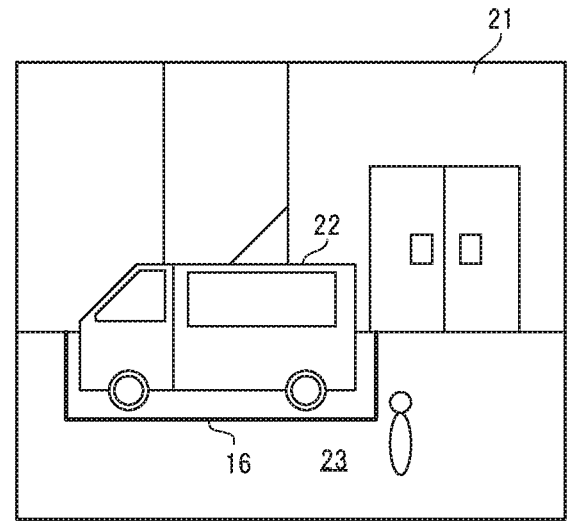

Here, a configuration of a monitoring system according to the present embodiment will also be described in addition to the monitoring apparatus 10 with reference to FIGS. 2 and 3. FIG. 2 is a block diagram specifically showing an example of a configuration of a monitoring system and a monitoring apparatus according to an embodiment of the present invention. FIGS. 3A to 3C are diagrams each illustrating an example of a series of processes for when a monitoring apparatus according to an embodiment of the present invention sets a new monitoring line.

As shown in FIG. 2, the monitoring system 100 according to the present embodiment includes the monitoring apparatus 10, a monitoring camera 20 that functions as the image capturing unit, and a display apparatus 30. The monitoring apparatus 10 is connected to the monitoring camera 20 and the display apparatus 30. Also, in addition to the monitoring line setting unit 11 and the overlapping detection unit 12, the monitoring apparatus 10 includes an image acquisition unit 13, a display unit 14, a notification unit 17, and an intrusion detection unit 18.

The image acquisition unit 13 acquires image data of an image (denoted hereinafter as "captured image") captured by the monitoring camera 20 from the monitoring camera 20. Also, the image acquisition unit 13 transfers the acquired image data (hereinafter denoted as "captured image data") to the monitoring line setting unit 11. Also, in the present embodiment, there is no particular limitation on the number of monitoring cameras 20, and multiple monitoring cameras 20 may be used. In this case, the image acquisition unit 13 acquires captured image data from each monitoring camera 20.

In the present embodiment, as shown in FIG. 3A, the monitoring line setting unit 11 sets the monitoring line 15 to a pre-designated position on the captured image data and uses it as image data for monitoring (hereinafter denoted as "monitoring image data"). When the monitoring image data is input to the display apparatus 30, the captured image on which the monitoring line is rendered is displayed on the screen. Also, the monitoring line setting unit 11 transfers the monitoring image data to the overlapping detection unit 12, the intrusion detection unit 18, and the display unit 14.

In the present embodiment, upon receiving the monitoring image data from the monitoring line setting unit 11, the overlapping detection unit 12 specifies a region (hereinafter denoted as a "change region") that changes in the monitoring image data by contrasting the received monitoring image data and image data serving as a reference. Since the change region corresponds to a newly-existing object, the overlapping detection unit 12 detects overlapping between the change region and the region in which the monitoring line is set in the monitoring image data.

For example, as shown in FIGS. 3A and 3B, a vehicle 22 is parked in front of a building 21 that is being monitored. In this case, the overlapping detection unit 12 specifies the region corresponding to the image data of the vehicle 22 as the change region, and furthermore specifies the region (hereinafter denoted as the "overlapping region") in which the change region and the region in which the monitoring line 15 is set overlap. Also, the overlapping detection unit 12 detects the overlapping region as "overlapping" when the percentage of the overlapping region with respect to the region in which the monitoring line 15 is set is greater than or equal to a threshold (e.g., 50%).

Also, if overlapping is detected by the overlapping detection unit 12, the monitoring line setting unit 11 erases the region of the region in which the monitoring line 15 is set that overlaps with the change region from the monitoring image data and sets a new monitoring line.

Accordingly, the monitoring image data is updated. Note that in this case, the monitoring line setting unit 11 may set the new monitoring line without erasing the region that overlaps with the change region.

In the present embodiment, if a new monitoring line is to be set, the monitoring line setting unit 11 can set the new monitoring line in a pre-designated region in the captured image data and the monitoring image data according to the outer edge of the object. Specifically, for example, in the example shown in FIG. 3C, a region 23 corresponding to a street is designated as the region in which the new monitoring line is set. Accordingly, the monitoring line setting unit 11 sets the new monitoring line 16 in the region 23 according to the shape of the vehicle 22.

Figure 4:
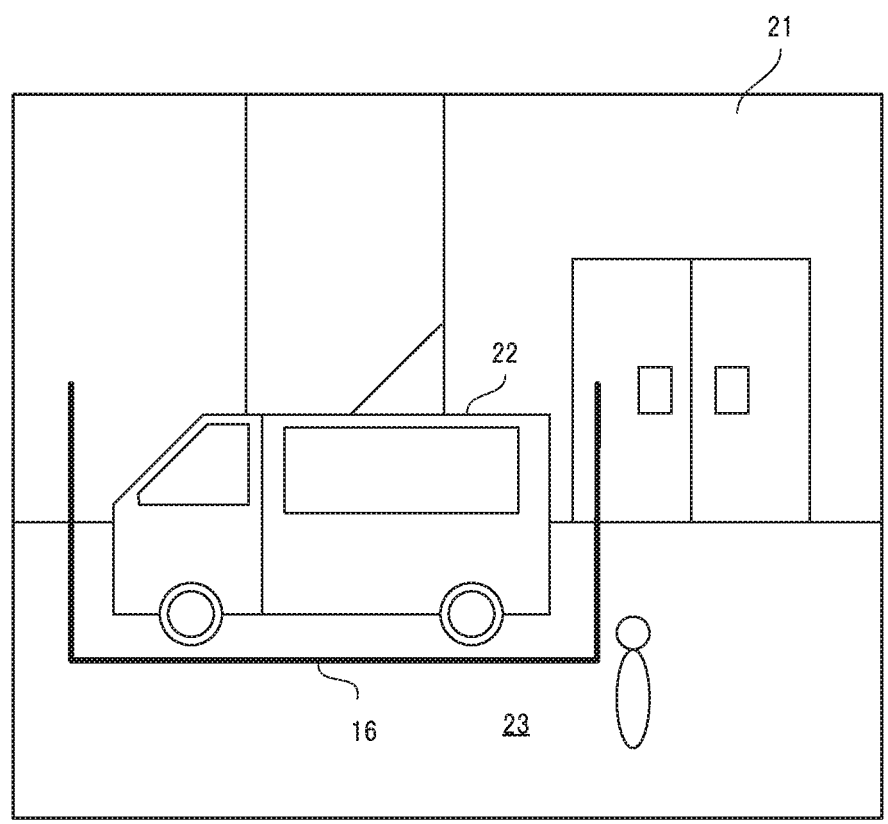
FIG. 4 is a diagram showing another example of a new monitoring line set by the monitoring apparatus according to an embodiment of the present invention.

Also, if overlapping is detected by the overlapping detection unit 12, as shown in FIG. 4, the monitoring line setting unit 11 can set the new monitoring line on only pre-designated sides according to the outer edge of the object. FIG. 4 is a diagram showing another example of a new monitoring line set by the monitoring apparatus according to an embodiment of the present invention. In the example shown in FIG. 4, the lower side, right side, and left side of the object are designated as the setting positions of the new monitoring lines 16. Accordingly, the monitoring line setting unit 11 sets the new monitoring lines 16 on the lower side, right side, and left side of the vehicle 22 in the captured image.

Also, upon receiving the monitoring image data in which the monitoring line 15 is set from the monitoring line setting unit 11, the display unit 14 inputs it to the display apparatus 30. Accordingly, the captured image on which the monitoring line 15 is rendered is displayed on the screen of the display apparatus 30. Furthermore, if overlapping is detected by the overlapping detection unit 12, the display unit 14 receives monitoring image data in which the monitoring line 16 is newly set from the monitoring line setting unit 11. In this case, in the present embodiment, the display unit 14 erases the portion of the monitoring line 15 that overlaps with the object and displays the new monitoring line 16 on the screen (see FIG. 3C).

Also, the intrusion detection unit 18 executes intrusion detection processing based on the monitor image data generated by the monitor line setting unit 11. Specifically, after the monitoring line 15 or 16 is set, the intrusion detection unit 18 detects a moving body based on the monitoring image data and determines whether or not the detected moving body has come into contact with the monitoring line 15 or 16. If it is determined that the moving body has come into contact with the monitoring line 15 or 16, it is detected that intrusion has occurred.

If the new monitoring line 16 (see FIGS. 3C and 4) has been set by the monitoring line setting unit 11, and if it is detected by the intrusion detection unit 18 that intrusion has occurred, the notification unit 17 performs notification to that effect to an external device. Specifically, the notification unit 17 executes an alarm to a manager, transmission of e-mail to a terminal apparatus (not shown in FIG. 2) of the manager, a phone call to the manager, or the like.

Operations of Apparatus

Figure 5:
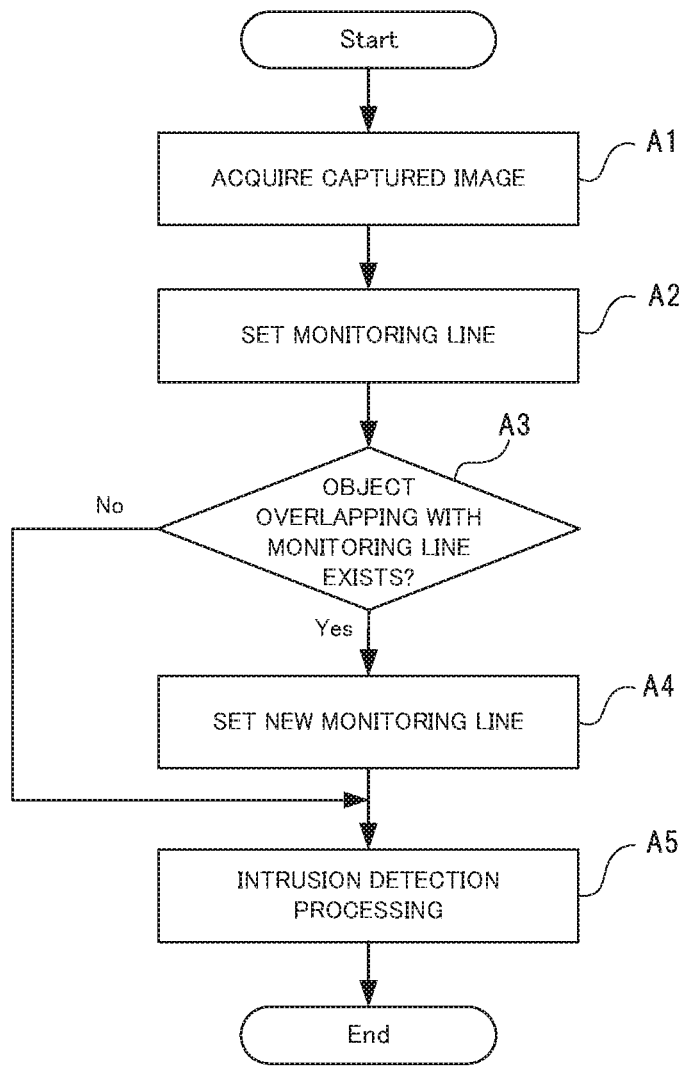
FIG. 5 is a flow diagram showing an example of operations performed by the monitoring apparatus according to an embodiment of the present invention.

Next, operations performed by the monitoring apparatus 10 according to an embodiment of the present invention will be described with reference to FIG. 5. FIG. 5 is a flow diagram showing an example of operations performed by a monitoring apparatus according to an embodiment of the present invention. FIGS. 1 to 4 will be referred to as needed in the following description. Also, in the present embodiment, the monitoring method is carried out by allowing the monitoring apparatus 10 to operate. Accordingly, the description of the monitoring method of the present embodiment will be substituted with the following description of operations performed by the monitoring apparatus 10.

First, as shown in FIG. 5, the image acquisition unit 13 acquires captured image data from the monitoring camera 20 (step A1). Also, the image acquisition unit 13 outputs the acquired captured image data to the monitoring line setting unit 11 and the overlapping detection unit 12.

Next, the monitoring line setting unit 11 sets the monitoring line 15 at a pre-designated position in the captured image data (step A2). Then, the monitoring line setting unit 11 transfers the monitoring image data in which the monitoring line 15 has been set to the overlapping detection unit 12, the intrusion detection unit 18, and the display unit 14.

Next, the overlapping detection unit 12 contrasts the monitoring image data received from the monitoring line setting unit 11 and the image data used as a reference, to specify a change region in the monitoring image data, and thereby determine whether or not an object overlapping with the monitoring line 15 exists (step A3). If it is determined in step A3 that no object overlapping with the monitoring line exists, step A5 is executed.

If it is determined in step A3 that an object overlapping with the monitoring line 15 exists, the overlapping detection unit 12 detects the portion (overlapping region) of the monitoring line 15 that overlaps with the object and transfers it to the monitoring line setting unit 11. Accordingly, the monitoring line setting unit 11 erases the portion of the monitoring line 15 that overlaps with the object from the monitoring image data and further sets a new monitoring line 16 (step A4). Accordingly, the monitoring image data is updated, and therefore the monitoring line setting unit 11 transfers the updated monitoring image data to the overlapping detection unit 12 and the intrusion detection unit 18.

If step A4 is executed and if it is determined in step A3 that no object exists, the intrusion detection unit 18 executes intrusion detection processing based on the monitoring image data generated by the monitoring line setting unit 11 (step A5).

Due to the execution of step A5, the series of processes ends, but when the monitoring camera 20 outputs a new captured image, step A1 is executed once again. In the present embodiment, steps A1 to A5 are executed each time a captured image is output by the monitoring camera 20.

Effect of the Embodiment

As shown in FIG. 3(b), a state is envisioned in which the vehicle 22 is parked between the facility being monitored and the monitoring camera 20, and the monitoring line 15 and the vehicle 22 overlap in the captured image. In this kind of state, an intruder can intrude in the facility being monitored by hiding in the shadow of the vehicle without coming into contact with the monitoring line 15. However, according to the present embodiment, when the monitoring line 15 and the vehicle 22 overlap, a new monitoring line 16 is set as shown in FIG. 3C, and therefore an intruder can be detected even in the above-described case.

Modified Examples

Figure 6:
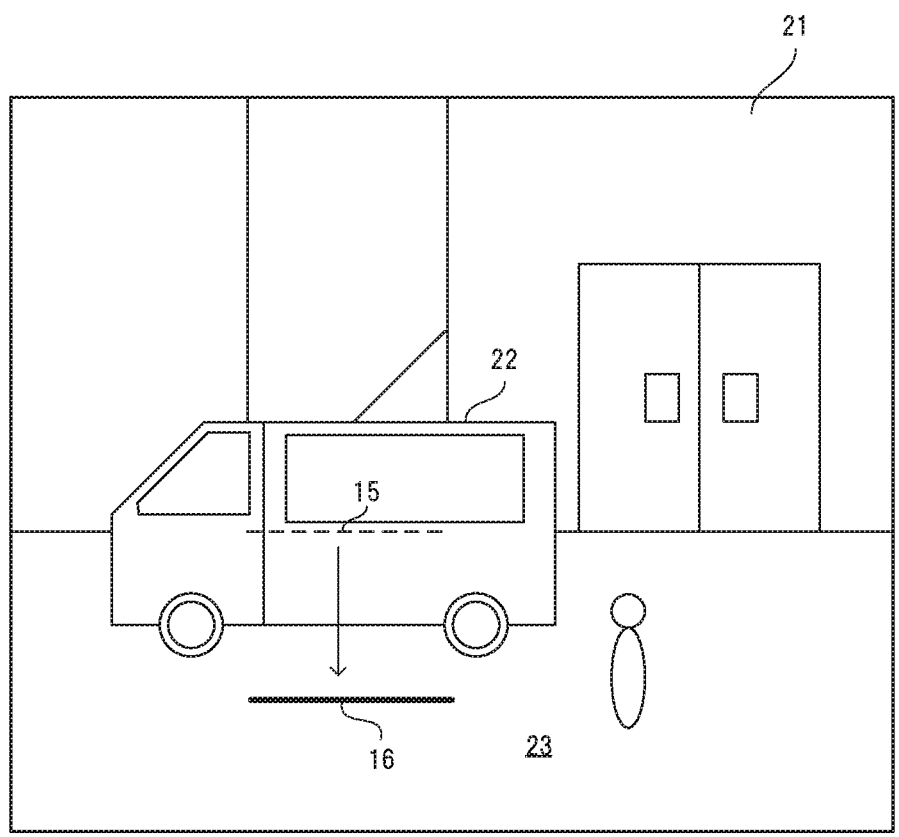
FIG. 6 is a diagram showing an example of a new monitoring line set in Modified Example 1 of an embodiment of the present invention.
Figure 7:
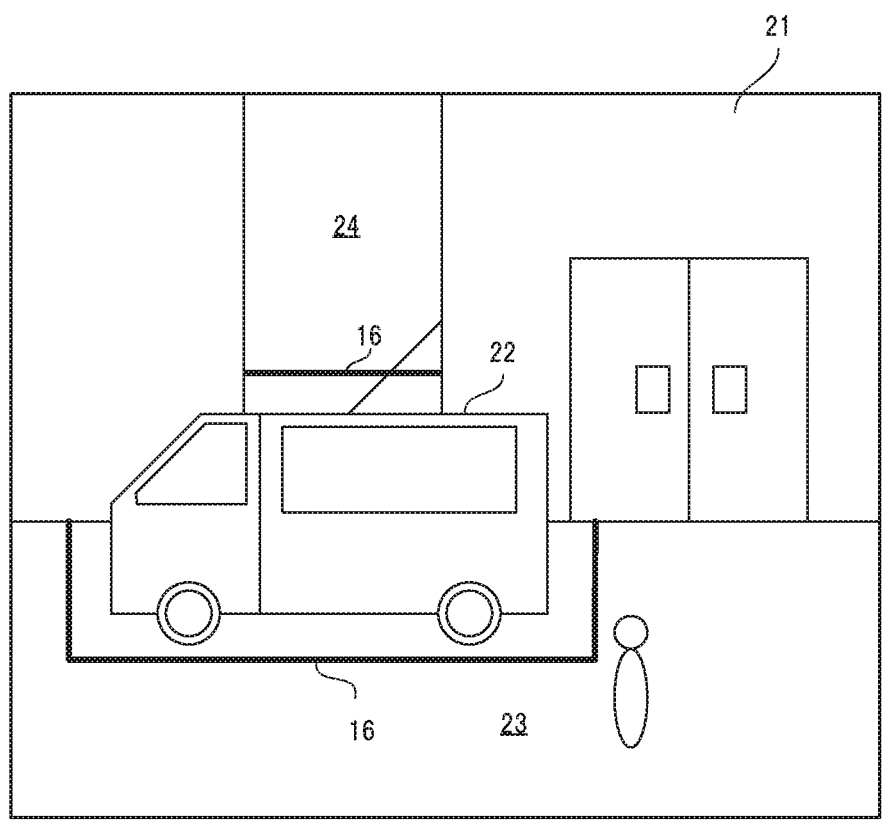
FIG. 7 is a diagram showing an example of a new monitoring line set in Modified Example 2 of an embodiment of the present invention.

Here, modified examples of the present embodiment will be described with reference to FIGS. 6 and 7. FIG. 6 is a diagram showing an example of a new monitoring line set in Modified Example 1 according to an embodiment of the present invention. FIG. 7 is a diagram showing an example of a new monitoring line set in Modified Example 2 according to an embodiment of the present invention.

Modified Example 1

As shown in FIG. 6, in the present embodiment, the monitoring line setting unit 11 can move the original monitoring line 15 such that it does not overlap with the object. In this case, the moved monitoring line becomes the new monitoring line 16. Note that the movement direction is not particularly limited and is set in advance by a manager.

Modified Example 2

As shown in FIG. 7, in the present embodiment, the monitoring line setting unit 11 sets the new monitoring line 16 at a position that does not overlap with the object in a pre-designated region. Specifically, as shown in FIG. 7, a region 23 corresponding to the street and a region 24 between the building 21 and a building adjacent thereto are designated at the setting regions of the new monitoring line. Accordingly, the monitoring line setting unit 11 sets the new monitoring line 16 in the region 23 and the region 24.

In this way, in the case of using Modified Examples 1 and 2 as well, the new monitoring line 16 is set such that the intruder cannot intrude by hiding in the shadow of the buildings that overlap with the monitoring line. The present Modified Examples 1 and 2 are also useful.

Program

A program of the present embodiment need only be a program for causing a computer to execute steps A1 to A5 shown in FIG. 5. The monitoring apparatus 10 and the monitoring method according to the present embodiment can be realized by installing the program on a computer and executing it. In this case, the CPU (Central Processing Unit) of the computer functions as the monitoring line setting unit 11, the overlapping detection unit 12, the image acquisition unit 13, the display unit 14, the notification unit 17, and the intrusion detection unit 18 and performs processing.

Figure 8:
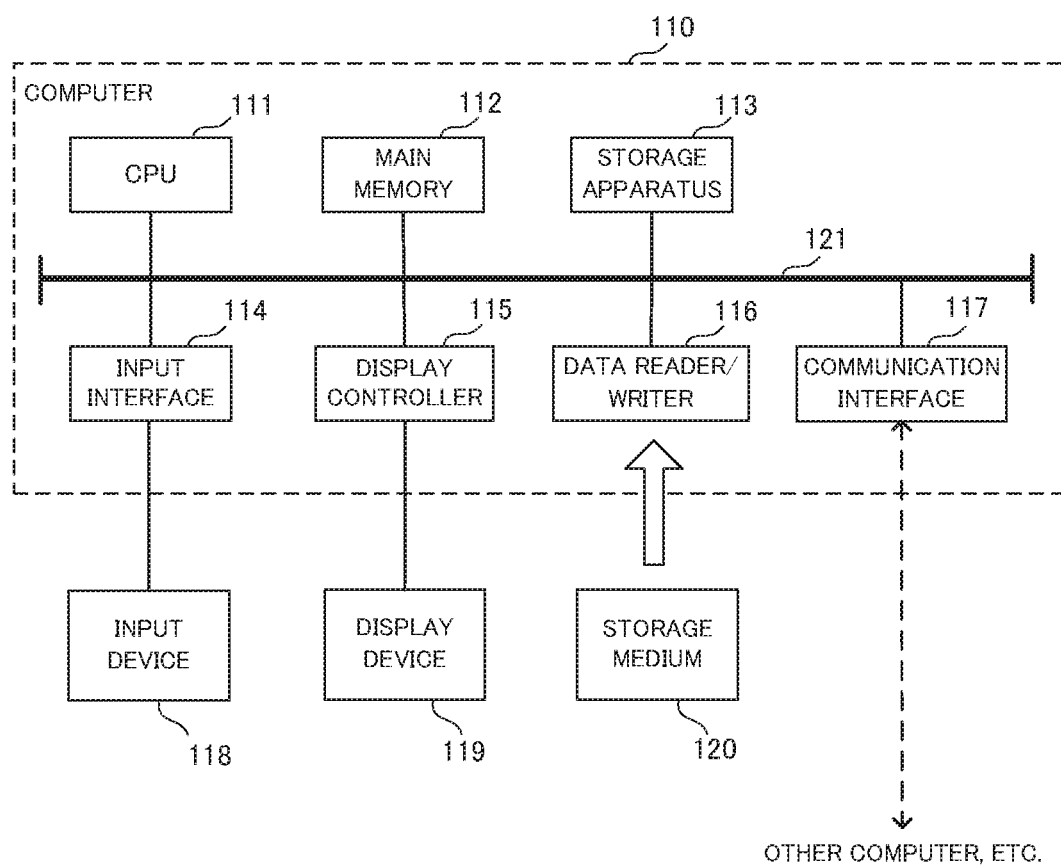
FIG. 8 is a block diagram schematically showing an example of a computer that realizes a monitoring apparatus according to an embodiment of the present invention.

Also, a computer that realizes the monitoring apparatus 10 by executing the program according to the present embodiment will be described with reference to the drawings. FIG. 8 is a block diagram showing an example of a computer that realizes the monitoring apparatus according to an embodiment of the present invention.

As shown in FIG. 8, the computer 110 includes a CPU 111, a main memory 112, a storage apparatus 113, an input interface 114, a display controller 115, a data reader/writer 116, and a communication interface 117. These units are connected via a bus 121 so as to be capable of mutual data communication.

The CPU 111 carries out various calculations by expanding programs (codes) according to the present embodiment, which are stored in the storage apparatus 113, to the main memory 112 and executing them in a predetermined sequence. The main memory 112 is typically a volatile storage device such as a DRAM (Dynamic Random Access Memory). Also, the program according to the present embodiment is provided in a state of being stored in a computer-readable storage medium 120. Note that the program according to the present embodiment may be distributed over the Internet, which is connected to via the communication interface 117.

Also, specific examples of the storage apparatus 113 include a semiconductor storage device such as a flash memory, in addition to a hard disk drive. The input interface 114 mediates data transmission between the CPU 111 and an input device 118 such as a keyboard or a mouse. The display controller 115 is connected to a display device 119 and controls display on the display device 119.

The data reader/writer 116 mediates data transmission between the CPU 111 and the storage medium 120, reads out programs from the storage medium 120, and writes results of processing performed by the computer 110 in the storage medium 120. The communication interface 117 mediates data transmission between the CPU 111 and another computer.

Also, specific examples of the storage medium 120 include a general-purpose semiconductor storage device such as CF (Compact Flash (registered trademark)) and SD (Secure Digital), a magnetic storage medium such as a flexible disk, and an optical storage medium such as a CD-ROM (Compact Disk Read Only Memory).

The above-described embodiment can be partially or entirely expressed by, but is not limited to, the following Supplementary Notes 1 to 24.

Supplementary Note 1

A monitoring apparatus including:
a monitoring line setting unit configured to set a monitoring line in an image acquired from an image capturing unit; and
an overlapping detection unit configured to detect overlapping between an object in the image and the monitoring line,
wherein if overlapping is detected by the overlapping detection unit, the monitoring line setting unit sets a new monitoring line according to the object.

Supplementary Note 2

The monitoring apparatus according to Supplementary Note 1, wherein
if overlapping is detected by the overlapping detection unit, the monitoring line setting unit sets the new monitoring line on a pre-designated side according to an outer edge of the object.

Supplementary Note 3

The monitoring apparatus according to Supplementary Note 1, wherein
if overlapping is detected by the overlapping detection unit, the monitoring line setting unit sets the new monitoring line in a pre-designated region according to an outer edge of the object.

Supplementary Note 4

The monitoring apparatus according to Supplementary Note 1, further including
a display unit that displays an image acquired from a monitoring camera and the monitoring line on a screen of a display apparatus,
wherein if overlapping is detected by the overlapping detection unit, the display unit erases the portion of the monitoring line that overlaps with the object from the screen and displays a new monitoring line on the screen.

Supplementary Note 5

The monitoring apparatus according to Supplementary Note 1, further including
a notification unit configured to, if a new line is set by the monitoring line setting unit, perform notification to that effect to an external device.

Supplementary Note 6

A monitoring apparatus including:
a monitoring line setting unit configured to set a monitoring line in an image acquired from an image capturing unit; and
an overlapping detection unit configured to detect overlapping between an object in the image and the monitoring line,
wherein if overlapping is detected by the overlapping detection unit, the monitoring line setting unit moves the monitoring line such that it does not overlap with the object.

Supplementary Note 7

A monitoring apparatus including:
a monitoring line setting unit configured to set a monitoring line in an image acquired from an image capturing unit; and
an overlapping detection unit configured to detect overlapping between an object in the image and the monitoring line,
wherein if overlapping is detected by the overlapping detection unit, the monitoring line setting unit sets a new monitoring line at a position that does not overlap with the object in a pre-designated region.

Supplementary Note 8

A monitoring system including:
a monitoring camera and a monitoring apparatus,
wherein the monitoring apparatus includes:
a monitoring line setting unit configured to set a monitoring line in an image acquired from the monitoring camera; and an overlapping detection unit configured to detect overlapping between an object in the image and the monitoring line, and if overlapping is detected by the overlapping detection unit, the monitoring line setting unit sets a new monitoring line according to the object.

Supplementary Note 9

A monitoring system including:

a monitoring camera and a monitoring apparatus, wherein the monitoring apparatus includes:

a monitoring line setting unit configured to set a monitoring line in an image acquired from the monitoring camera; and an overlapping detection unit configured to detect overlapping between an object in the image and the monitoring line, and if overlapping is detected by the overlapping detection unit, the monitoring line setting unit moves the monitoring line such that it does not overlap with the object.

Supplementary Note 10

A monitoring system including:

a monitoring camera and a monitoring apparatus, wherein the monitoring apparatus includes:

a monitoring line setting unit configured to set a monitoring line in an image acquired from the monitoring camera; and an overlapping detection unit configured to detect overlapping between an object in the image and the monitoring line, and if overlapping is detected by the overlapping detection unit, the monitoring line setting unit sets a new monitoring line at a position that does not overlap with the object in a pre-designated region.

Supplementary Note 11

A monitoring method including:

(a) a step of setting a monitoring line in an image acquired from an image capturing unit;

(b) a step of detecting overlapping between an object in the image and the monitoring line; and (c) a step of setting a new monitoring line according to the object if overlapping is detected in the (b) step.

Supplementary Note 12

The monitoring method according to Supplementary Note 11, wherein if overlapping is detected in the (b) step, in the (c) step, the new monitoring line is set on a pre-designated side according to an outer edge of the object.

Supplementary Note 13

The monitoring method according to Supplementary Note 11, wherein if overlapping is detected in the (b) step, in the (c) step, the new monitoring line is set in a pre-designated region according to an outer edge of the object.

Supplementary Note 14

The monitoring method according to Supplementary Note 11, further including:

(d) a step of displaying an image acquired from a monitoring camera and the monitoring line on a screen of a display apparatus; and (e) a step of erasing the portion of the monitoring line that overlaps with the object from the screen and displaying a new monitoring line on the screen if overlapping is detected in the (b) step.

Supplementary Note 15

The monitoring method according to any one of Supplementary Notes 11 to 14, further including a step of, if a new monitoring line is set in the (c) step, performing notification to that effect to an external device.

Supplementary Note 16

A monitoring method including:

(a) a step of setting a monitoring line in an image acquired from an image capturing unit;

(b) a step of detecting overlapping between an object in the image and the monitoring line; and (c) a step of moving the monitoring line such that it does not overlap with the object if overlapping is detected in the (b) step.

Supplementary Note 17

A monitoring method including:

(a) a step of setting a monitoring line in an image acquired from an image capturing unit;

(b) a step of detecting overlapping between an object in the image and the monitoring line; and (c) a step of setting a new monitoring line at a position such that it does not overlap with the object in a pre-designated region if overlapping is detected in the (b) step.

Supplementary Note 18

A computer-readable storage medium storing a program that includes commands for causing a computer to execute:

(a) a step of setting a monitoring line in an image acquired from an image capturing unit;

(b) a step of detecting overlapping between an object in the image and the monitoring line; and (c) a step of setting a new monitoring line according to the object if overlapping is detected in the (b) step.

Supplementary Note 19

The computer-readable storage medium according to Supplementary Note 18, wherein if overlapping is detected in the (b) step, in the (c) step, the new monitoring line is set on a pre-designated side according to an outer edge of the object.

Supplementary Note 20

The computer-readable storage medium according to Supplementary Note 18, wherein if overlapping is detected in the (b) step, in the (c) step, the new monitoring line is set in a pre-designated region according to an outer edge of the object.

Supplementary Note 21

The computer-readable storage medium according to Supplementary Note 18, further including a command for causing a computer to execute:

(d) a step of rendering the monitoring line on the image acquired from the image capture unit to generate an image for monitoring and displaying the generated image for monitoring on a screen of a display apparatus; and (e) a step of, if overlapping is detected in the (b) step, erasing the portion of the monitoring line that overlaps with the object from the image for monitoring, rendering a new monitoring line, and displaying the acquired image for monitoring on the screen.

Supplementary Note 22

The computer-readable storage medium according to Supplementary Note 18, further including a command for causing a computer to execute a step of, if a new monitoring line is set in the (c) step, performing notification to that effect to an external device.

Supplementary Note 23

A computer-readable storage medium storing a program that includes commands for causing a computer to execute:

(a) a step of setting a monitoring line in an image acquired from an image capturing unit;
(b) a step of detecting overlapping between an object in the image and the monitoring line; and
(c) a step of moving the monitoring line such that it does not overlap with the object if overlapping is detected in the (b) step.

Supplementary Note 24

A computer-readable storage medium storing a program that includes commands for causing a computer to execute:
(a) a step of setting a monitoring line in an image acquired from an image capturing unit;
(b) a step of detecting overlapping between an object in the image and the monitoring line; and
(c) a step of setting a new monitoring line at a position such that it does not overlap with the object in a pre-designated region if overlapping is detected in the (b) step.

Although the present invention has been described with reference to an embodiment, the present invention is not limited to the above-described embodiments. Various modifications that a person skilled in the art can understand may be applied to the configuration and the details of the present invention within the scope of the present invention.

This application claims priority to Japanese Patent Application No. 2015-059782, filed on Mar. 23, 2015, the disclosure of which is incorporated in its entirety herein by reference.

INDUSTRIAL APPLICABILITY

According to the present invention, an intruder can be detected even if a pre-set monitoring line overlaps with an object on an image from a monitoring camera. The present invention is useful in a monitoring system.

DESCRIPTIONS OF REFERENCE NUMERALS

10 Monitoring apparatus
11 Monitoring line setting unit
12 Overlapping detection unit
13 Image acquisition unit
14 Display unit
15, 16 Monitoring line
17 Notification unit
18 Intrusion detection unit
20 Monitoring camera
21 Building being monitored
22 Vehicle
23 Region corresponding to street
24 Region between buildings
30 Display apparatus
100 Monitoring system
110 Computer
111 CPU
112 Main memory
113 Storage apparatus
114 Input interface
115 Display controller
116 Data reader/writer
117 Communication interface
118 Input device
119 Display apparatus
120 Storage medium
121 Bus

The invention claimed is:

1. A monitoring system comprising:
at least one memory storing instructions; and
at least one processor coupled to the at least one memory and configured to execute the instructions to:
set a monitoring line for detecting intrusion by a moving object in a moving image acquired by a capturing device;
detect that a position at which the monitoring line is being set gets to be hidden by an object in the moving image; and
set, when the position is being hidden by the object, a new monitoring line according to at least any of a position of the object and a shape of the object; and
divide the new monitoring line into a region A and a region B in a case that the region A, corresponding to a street, and the region B, between buildings adjacent thereto, are designated at setting regions of the new monitoring line.

2. The monitoring system according to claim 1, wherein the at least one processor is configured to
set, when the position is being hidden by the object, the new monitoring line on a pre-designated side, according to an outer edge of the object.

3. The monitoring system according to claim 1, wherein the at least one processor is configured to set, when the position is being hidden by the object, the new monitoring line in a pre-designated region, according to an outer edge of the object.

4. The monitoring system according to claim 1, wherein the at least one processor is configured to set, when the position is being hidden by the object, the new monitoring line by moving the monitoring line such that the monitoring line is not overlapped by the object.

5. The monitoring system according to claim 1, wherein the at least one processor is further configured to perform notification to an external device when the new monitoring line has been set.

6. A monitoring method comprising:
setting a monitoring line for detecting intrusion by a moving object in a moving image acquired by a capturing device;
detecting that a position at which the monitoring line is being set gets to be hidden by an object in the moving image;
automatically setting, when the position is being hidden by the object, a new monitoring line according to at least any of a position of the object and a shape of the object; and
dividing the new monitoring line into a region A and a region B in a case that the region A, corresponding to a street, and the region B, between buildings adjacent thereto, are designated at setting regions of the new monitoring line.

7. The monitoring method according to claim 6, wherein the setting comprises setting the new monitoring line on a pre-designated side, according to an outer edge of the object.

8. The monitoring method according to claim 6, wherein the setting comprises setting the new monitoring line in a pre-designated region, according to an outer edge of the object.

9. The monitoring method according to claim 6, wherein the setting comprises setting the new monitoring line by moving the monitoring line such that the monitoring line is not overlapped by the object.

10. The monitoring method according to claim 6, further comprising:
performing notification to an external device when the new monitoring line has been set.

11. A non-transitory computer-readable storage medium storing a program that causes a computer to perform:
- setting a monitoring line for detecting intrusion by an moving object in a moving image acquired by a capturing device;
- detecting that a position at which the monitoring line is being set gets to be hidden by an object in the moving image;
- automatically setting, when the position is being hidden by the object, a new monitoring line according to at least any of a position of the object and a shape of the object; and
- dividing the new monitoring line into a region A and a region B in a case that the region A, corresponding to a street, and the region B, between buildings adjacent thereto, are designated at setting regions of the new monitoring line.

12. The storage medium according to claim 11, wherein the setting comprises setting the new monitoring line on a pre-designated side, according to an outer edge of the object.

13. The storage medium according to claim 11, wherein the setting comprises setting the new monitoring line in a pre-designated region, according to an outer edge of the object.

14. The storage medium according to claim 11, wherein the setting comprises setting the new monitoring line by moving the monitoring line such that the monitoring line is not overlapped by the object.

15. The storage medium according to claim 11, wherein the program further causes the computer to perform notification to an external device when the new monitoring line has been set.

* * * * *